United States Patent [19]

Morris et al.

[11] 4,093,177
[45] June 6, 1978

[54] DASHPOT MECHANISM FOR SELF-CLOSING PLUMBING VALVES

[75] Inventors: Earl L. Morris, Whittier; Larry D. Fields, La Puente, both of Calif.

[73] Assignee: Acorn Engineering Company, City of Industry, Calif.

[21] Appl. No.: 668,285

[22] Filed: Mar. 18, 1976

[51] Int. Cl.² .......................... F16K 31/48; F16F 9/10
[52] U.S. Cl. ..................................... 251/54; 188/298; 188/316
[58] Field of Search .................... 251/54, 55; 188/316, 188/312, 298

[56] References Cited

U.S. PATENT DOCUMENTS

| 1,857,363 | 5/1932 | Dencklau | 251/55 |
| 2,507,268 | 5/1950 | Patriquin | 188/316 |
| 2,579,334 | 12/1951 | Plank | 251/54 |
| 2,781,519 | 2/1957 | Marchant | 4/31 |
| 3,266,603 | 8/1966 | Kamimoto | 188/298 X |
| 3,441,053 | 4/1969 | Robinson | 251/54 X |
| 3,484,090 | 12/1969 | Mahoney | 188/298 X |
| 3,933,337 | 1/1976 | Morris et al. | 251/54 |

FOREIGN PATENT DOCUMENTS 1,625,948   12/1970   Germany .......................... 188/298

Primary Examiner—Arnold Rosenthal
Attorney, Agent, or Firm—Ben E. Lofstedt

[57] ABSTRACT

An improved liquid-filled dashpot mechanism for use with a spring-biased, axially-displaceable valve stem, comprising: a housing having a passageway therein, a stem in the passageway adapted for reciprocation therein, a pair of annular rolling diaphragms disposed in spaced-apart, face-to-face relationship within the passageway in the housing, each diaphragm being respectively secured in fluid sealing relationship to the housing and the stem to collectively form an enclosed container for the dashpot liquid, a piston fixedly mounted on the stem intermediate the rolling diaphragms adapted for operative displacement within the housing and dividing the container into two chambers, a liquid metering passageway in the piston for providing fluid communication between the two chambers, and a check valve secured to the piston to permit the unidirectional flow of liquid therethrough, and when the dashpot liquid is not permitted to flow through the check valve, to direct the flow of dashpot fluid through the liquid metering passageway, thereby effecting dashpot action.

3 Claims, 6 Drawing Figures

DASHPOT MECHANISM FOR SELF-CLOSING PLUMBING VALVES

BACKGROUND OF THE INVENTION

1. Field of the Invention

This invention relates to valves for controlling the flow of liquids, and more particularly to plumbing valves of the type which, once turned on, shut-off automatically following a predetermined time interval. More specifically, the invention is directed to improvements in that type of automatic shut-off or self-closing valve in which a dashpot is used to control the length of time that the valve remains "on" or "open" to permit the flow of a liquid, typically water, therethrough.

2. Description of the Prior Art

In the prior art, a valve of the type characterized by the present invention is generally operated by an axially-displaceable valve stem or plunger which is adapted to be depressed against the force of a spring to turn "on" or "open" the valve, thereby permitting the liquid, typically water, to flow therethrough. The valve inside the water faucet usually comprises an annular shoulder of an elastomeric material, such as rubber, neoprene and the like, on the valve stem. This valve normally is held in its "off" or "closed" position by a compression spring which biases the annular shoulder against a circular valve seat secured to the body of the faucet and through which the plunger projects. In most cases, the dashpot is located within the body of the faucet and submerged in water. A piston is mounted on the plunger or valve stem and when the stem is axially depressed further into the body of the faucet, the piston is moved nearer the bottom of the dashpot chamber. Means for permitting the water in the dashpot chamber to be readily by-passed about the piston to the other side thereof during depression of the stem are employed to increase the speed at which the valve stem may be depressed and to reduce the magnitude of the force required to depress the stem to a minimum value so as to allow it to be manually operated. When the force applied to effect depression of the valve stem is removed, the by-passing means are rendered inoperative. A restricted orifice is employed to provide fluid communication between the two chambers formed within the dashpot chamber on either side of the piston, and as the spring-biased valve stem to which the piston is mounted is urged into the valve's closed position, the orifice meters the water from one side of the piston to the other within the dashpot chamber, thereby slowing the upward, valve closing movement of the spring-biased plunger. Thus, it may be readily observed that the rate of valve closure is primarily controlled by the size of the dashpot orifice.

Examples of such prior art devices such as fundamentally described hereinbefore are disclosed in, and exemplified by, U.S. Pat. Nos.: 95,054 (Smith); 2,181,581 (Fraser); 2,710,736 (Miller); 2,991,795 (Fraser, et. al.); 3,065,948 (Nolan) and 3,342,448 (Parkinson). All of these devices employ water as the non-elastic, dashpot liquid.

In such prior art devices, the dashpot has been a source of considerable trouble in the maintenance of this type of faucet. Because the dashpot is submerged in and employs water as the dashpot liquid, the restricted orifice of the dashpot is subject to becoming fouled by hard water deposits, scale, foreign material, debris, etc. which renders the time delaying function of the dashpot inoperative. Consequently, it has been necessary in the past to disassemble the faucet quite frequently to maintain dashpot operation. Due to the relative complexity of the dashpot mechanism, such disassembly required the employing of someone, such as a qualified plumber, having the requisite plumbing tools and skills.

In an attempt to remedy this situation, some of the prior art devices, namely: U.S. Pat. Nos. 2,181,581 (Fraser); 2,710,736 (Miller); 2,991,795 (Fraser, et. al.) and 3,065,948 (Nolan) all utilized a movable pin which periodically moved in and out of the restricted orifice or water metering passageway to clear it of the restricting material blocking the metering passageway. However, even the use of such a pin to create a so-called "self-cleaning orifice" was found to be inadequate to effect reliable operation of the dashpot because within a very short period of time the mineralization will clog the liquid metering combination of the pin-and-orifice and thereby render it inoperative in any event.

Other attempts at improving the reliability fo the restricted orifice include the use of a flexible rubber annulus such as used in U.S. Pat. No. 3,065,948 (Nolan) to provide a throttling effect for the flow of water through the aperture in the annulus. This type of throttle valve has the advantage in a faucet of this type in that scale accumulations upon it may be broken free by expanding and contracting the rubber annulus. In essence, the action is likened to the pulsating action of the deicing boots which were once used on aircraft wings. However, in order to produce such pulsations in the rubber annulus, external adjustment is required. Further, such a rubber annulus is subject to not only variations in water pressure which produces a variation in the size of the restricted orifice, but to wear as well.

Additionally, in spite of the aforementioned attempts to improve the operational reliability of the dashpot, nevertheless, such reliability was not achieved. If the solid particles in the water are not filtered out before reaching the dashpot chamber, the particles will be deposited within the dashpot chamber and either completely fill it, or at the very least, unduly limit the stroke of the dashpot piston. In either case, the time delay is either significantly shortened or becomes "zero". However, even though many of the prior art devices employed, such as U.S. Pat. Nos.: 2,181,581 (Fraser); 2,991,795 (Fraser, et. al.); and 3,065,948 (Nolan), a filter or screen by which to block the flow of foreign particles or debris into the dashpot chamber and dashpot orifice, the filter would become clogged and, thereafterwards virtually stop the flow of water into the dashpot, thereby rendering it non-operative.

In addition, the viscosity of water acts as a practical limit on the amount of time delay available in a dashpot device such as found in the aforementioned patents.

Utilizing a liquid for dashpot metering other than water in a water supply system obviously requires that the metering liquid be isolated from the water supply system simply because it may be non-potable or even toxic. Prior art devices which have recognized the usefulness and desirability of substituting a liquid other than water in the dashpot, thereby preventing clogging by mineralization, scale formation, foreign debris and the like, include U.S. Pat. Nos.: 793,698 (Walter) and 2,825,427 (Steibel) both of which suggested the use of oil, glycerin or other hydraulic fluid.

It should be noted at this time, however, that not all hydraulic liquids are suitable even if non-toxic and/or potable. The liquid selected for use as the dashpot liquid must also have, as a practical matter, a rather large heat capacity to preclude it from being converted into its gaseous phase when the dashpot mechanism is used with a hot water supply. Should this occur, the dashpot time-delay would be reduced and/or the fluid seals may be unable to adequately contain the metering fluid in its gaseous phase. However, a major and unacceptable problem, nevertheless, arose in the use of these prior art devices, in that, during reciprocation of the valve stem or plunger, the fluid seal between the dashpot housing or body and the plunger permitted a small amount of the hydraulic fluid to be lost during each reciprocation. Consequently, after so many cycles of operation, the hydraulic fluid had to be replaced or the dashpot would become inoperative.

Steibel recognized the problem of hydraulic fluid loss inherent in each cycle of reciprocation of the dashpot plunger or piston stem. Steible attempted to solve the effects of such losses of dashpot liquid when using a liquid other than water by incorporating a reservoir therein. However, it was quickly found that the use of a reservoir by which to re-supply the liquid lost merely delayed the inevitable, and did not solve the problem. For example, in the case of the Steibel patent, the reciprocation of the piston stem 22 in and out of the dashpot liquid resulted in some loss of the dashpot liquid as the piston stem 22 exited the body 10 even though the seals 23 wiped the piston stem 22 as it exited.

Also, it should be noted that even though Steibel employed hydraulic fluid as the dashpot liquid, due to the other structural and operational characteristics of the Steibel device, Steibel required the use of a filter means for preventing clogging of the control bore (see Column 4, lines 56 and 57). The use of such filters, as previously discussed, is undesirable because it merely delays the inevitable clogging which it purports to prevent, and, thereby, makes the dashpot mechanism unreliable.

Further, in the device of Walter, the hydraulic fluid disposed on the plunger or valve stem was, upon actuation thereof, placed within the water passageway, thereby placing an amount of hydraulic fluid in the water and contaminating it.

Still further, when annular fluid seals are used about the valve stem or plunger to prevent the hydraulic fluid from leaking out therebetween, a frictional force is created so that when the stem is actuated, the magnitude of the actuation force must not only move the plunger, but it must also overcome the frictional forces of the various fluid seals surrounding the stem. Consequently, in practice, the actuation force required is so great that small children of kindergarten age are unable to manually actuate the plunger to turn the faucet on, thereby rendering this kind of device unsuitable for use by children.

The present invention as disclosed hereinafterwards was discovered during the search for a solution to this perplexing problem.

SUMMARY OF THE INVENTION

The fundamental invention disclosed herein comprises an improved liquid-filled dashpot mechanism for use with a spring-biased, axially-displaceable valve stem, including: a housing having a passageway therein, a stem in the passageway adapted for reciprocation therein, a pair of annular rolling diaphragms disposed in spaced apart, face-to-face relationship within the passageway in the housing, each diaphragm being respectively secured in fluid sealing relationship to the housing and the stem to collectively form an enclosed container for the dashpot liquid, a piston fixedly mounted on the stem intermediate the rolling diaphragms adapted for operative displacement within the housing and dividing the container into two chambers, a liquid metering pasageway in the piston for providing fluid communication between the two chambers, and a check valve seucred to the piston to permit the unidirectional flow of liquid therethrough, and when the dashpot liquid is not permitted to flow through the check valve, as heretofore described, the dashpot liquid is directed to flow through the liquid metering passageway, thereby effectuating the desired dashpot action.

It should, however, be noted that it is frequently desirable to employ a liquid metering passageway construction which is capable of external adjustment so as to permit the selection of the amount of dashpot time delay as needed.

OBJECTS OF THE INVENTION

It is a principal and primary object of the instant invention to provide a new and improved self-closing valve which is arranged so that the retarded closing action of the valve which it controls is repeated at a precise and unvarying rate irrespective of variations in the inlet pressure of the water supply controlled by the valve.

An object of the invention is to provide a self-closing valve using a potable liquid, such as silicon liquid, as the dashpot liquid.

Another principal object of the present invention is to provide a new and improved self-closing valve which possesses a single elastomeric member in moving contact with the walls of the dashpot chamber and operatively immersed in the dashpot liquid so as to reduce to an absolute minimum the frictional wear on the member.

Another object of the present invention is to provide a novel and unique self-closing liquid control valve capable of retarding the closing movement of the valve yet permitting rapid opening movement when the valve stem is depressed to open the valve.

A still further object of the invention is to provide an improved manually operable, self-closing valve capable of being actuated by means of a relatively low operating force to permit small children of kindergarten age to easily operate the valve.

A further object of the invention is to provide a new and improved self-closing valve which is highly reliable and effective in operation.

Another important object of the instant invention is to provide a self-closing valve which is readily adjustable for varying the quantity of water discharged therethrough.

It is a still further important and primary object of the present invention to provide a time-delayed, self-closing valve which is easy to manufacture and to assemble.

Another object of the invention is to provide a time-delayed, self-closing valve wherein the liquid used in the time-delaying or dashpot mechanism is totally isolated from the water supply controlled by the valve.

A yet still further and important object of the present invention is to provide a valve operating mechanism which is inherently self-enclosed and not susceptible to vandalism frequently encountered in public institutions where the present invention will find wide-spread use and application.

An important object of one of the embodiments of the instant invention is to provide means for externally adjusting the duration of the time delay of the dashpot mechanism without the necessity of disassembling the invention.

Another primary and important object of the present invention is to provide a self-closing, time-delayed valve which is completely isolated from scale, foreign particles and other undesirable debris inherent in water supplies which can clog the timing orifice through which the timing liquid passes and thereby render the time-delaying function of the dashpot mechanism of the invention inoperative.

Another object of the instant invention is to provide means for coupling the manually actuated push button which caps the externally-disposed end of the valve and dashpot stem to the stem so that rotation of the pushbutton will not cause corresponding rotation of the valve and dashpot stem.

The various features of novelty which characterize this invention are pointed out with particularity in the claims annexed to and forming a part of this specification.

For a better understanding of the invention, however, its advantages, and specific objects by its use, reference should be had to the accompanying drawings and descriptive matter in which have been illustrated and described the preferred embodiments of the invention.

In the drawings:

Figures 1A, 1B:
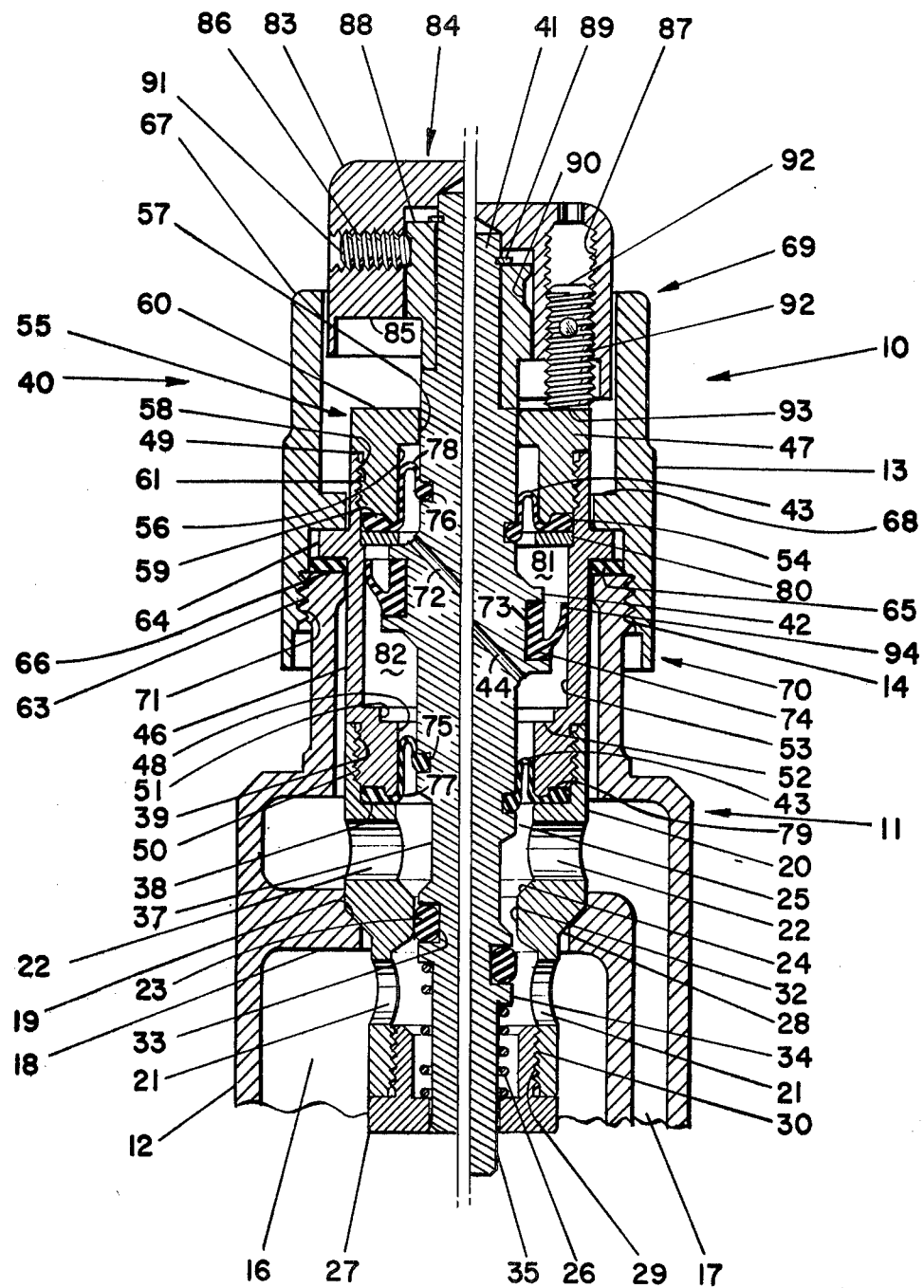
FIG. 1A is a cross-sectional view of one embodiment of a self-closing valve embodying the present invention wherein the component parts thereof are shown in an inoperative or "closed" position.
FIG. 1B is a cross-sectional view of the self-closing valve of FIG. 1A wherein the component parts thereof are shown in an operative or "open" position.

DESCRIPTION OF THE PREFERRED EMBODIMENTS OF THE PRESENT INVENTION:

Prior to launching into a detailed and informative disclosure of the preferred embodiments envisioned for the present invention, it is to be clearly understood that the instant invention is not limited in any way in its application, to the details of construction and arrangement of parts illustrated in the accompanying drawings, since the subject invention is readily capable of other embodiments and of being practiced or carried out in various and diverse ways. It should be further understood that the particular phraseology or terminology employed herein is merely for the sole purpose of description and is not intended to be limiting in any way, form or fashion.

With continued reference to the drawings, the improved dashpot mechanism of the present invention is generally designated by the numeral 10, and is depicted in this particular embodiment in cartridge form wherein the dashpot mechanism 10 is integrally combined with a plumbing valve unit generally indicated at 11.

As clearly shown in the drawings, the instant invention 10 is shown assembled to the plumbing valve 11 and is threadably secured to a water supply pipe 12, in the manner hereinafterwards detailed and described via the coupling member 13, about the threaded section 14 of the necked-down, upstanding section 15 of the water supply pipe 12. Immediately below the upstanding section, the water supply pipe 15, the water supply pipe 12 is increased in diameter to form an enlarged chamber area which is descriptively divided into a water inlet chamber 16 and a water outlet chamber 17 by an internal annular shoulder 18. The upper surface of the shoulder 18 facing the water outlet chamber 17 is countersunk to form a beveled seating surface 19 whose use and purpose will be more fully described as the invention is further disclosed hereinafterwards.

Turning now to the valve cartridge 11, it may be seen that it basically comprises a generally tubular valve housing 20 with apertures therein serving as water inlets 21 and water outlets 22, a valve head 23, a valve seat 24, an axially-displaceable stem 25, a wire coil spring 26, and a removable end member. The outside diameter of the housing 20 is smaller than the inside diameter of the upstanding section 15 of the water supply pipe 12 and is adapted to be slideably inserted thereinto in substantially fluid-sealing relationship therewith. While the outside of the housing 20 is generally characterized throughout a major portion of its length by a relatively smooth surface having a constant cross-section, it, however, is abruptly tapered, in an inwardly-directed fashion, to form a beveled surface 28 for fluid-sealing engagement with the seating surface 19 of the shoulder 18.

Immediately below the beveled surface 28 of the valve housing 20, two oppositely-disposed apertures serving as water inlets 21 are drilled through the wall of the valve housing 20. These water inlets 21 allow continuous fluid communication between the water inlet chamber 16 and the inside of the valve housing 20.

Immediately beneath the water inlets 21 and adjacent the end of the housing 20 there is a threaded section 29 about the inside of the tubular valve housing 20. A removable end member 27 having a tubular, externally-threaded shank 30 with an annular flange 31 capping one end thereof is threadably mated with the threaded section 29 of the housing 20. The outside diameter of the flange 31 is preferably made as large as the outside diameter of the tubular valve housing 20 below the water inlets 21 so that the flange 31 may be also passed beyond the beveled surface 28 and into the water inlet chamber 16.

Adjacent the beveled surface 28 of the housing 20 and disposed thereabove, two oppositely-disposed apertures serving as water outlets 22, are drilled through the wall of the valve housing 20. Similar to water inlets 21 and the water inlet chamber 16, continuous fluid communication is provided between the water outlet chamber 17 and the inside of the valve housing via the water outlets 22.

Inside the valve housing 20 located intermediate the water inlets 21 and the water outlets 22, is an inwardly-projecting annular shoulder section having a smooth bore section 32 therethrough which serves as a valve seat 24 as further described and discussed hereinafterwards.

The movable portion of the valve cartridge 11 comprises the axially-displaceable stem 25, the valve head 23, and the wire coil spring 26. The diameter of the valve stem 25 is smaller than the diameter of the smooth bore section 32 so that the stem may be coaxially disposed within the valve housing 20 for reciprocation therein. Adjacent the lower end of the stem 25, an annular groove 33 is cut into the stem 25 into which the valve head 23, here depicted as an annular body of resilient material, such as an elastomeric substance like Neoprene, Epichlorohydrin, Silicon, Fluorinated Silicon, Viton, Butyl, Urethane rubbers, Hypalon and the like, is nested. By mounting and cradling the valve head 23 on the stem 25 in the groove 33, not only are the sidewalls of the valve head 23 supported but the valve head 23 is positionally retained on the stem 25. It should be noted that when installed in the groove 33, the outside diameter of the valve head 23 is greater than the diameter of the smooth bore section 32 for reasons which will become obvious as the description proceeds herein.

Immediately below the groove 33, the valve stem 25 is undercut to form an annular shoulder portion 34 and a stem portion 35 of reduced diameter between the groove 33 and the end 9 of the stem 25 adjacent thereto. The reduced diameter stem portion 35 is slightly smaller in diameter than the aperture 36 of the annular flange 31 to be slideably guided therein, thereby both serving as a part of a spacing means whereby the stem 25, and the various components fixedly secured thereto, are maintained in a fixed coaxial relationship relative to the valve housing, and as a vertical alignment guiding means for the stem 25.

The wire coil spring 26 has an inside diameter larger than the diameter of the reduced diameter stem portion 35, but smaller than the diameter of the annular shoulder portion 34 thereabout. The removable end member 27 has an aperture 36 therethrough which is slightly larger in diameter than the stem portion 35. Prior to mating of the end member 27 to the valve housing 20, the compression spring 26 is passed over the end of the valve stem portion 35. Thereafterwards, when the end member 27 is threadably secured to the valve housing 20, the compression spring 26 is compressively captured between the shoulder 34 and the flange 31 of the end member 27. As a result, the spring 26 exerts a continuous upwardly-directed bias on the stem 25, both for purposes hereinafterwards made obviously clear by further description and discussion and for biasing the stem 25 so that the valve head 23 may be positioned to be placed in fluid sealing engagement with the smaller diametered valve seat 24, thereby operatively maintaining the valve in a "closed" position to prevent the passage of water therethrough.

As illustrated in this particular embodiment of the valve 11, that portion of the valve stem 25 adjacently disposed immediately above the groove 33 is undercut at 37. The purpose of this undercut 37 is merely to reduce the diameter of the valve stem 25 which is operatively disposed within the water outlet chamber 17 so that it approximately equals the diameter of the reduced diameter portion 35 of the stem 25 so that both stem portions displace relatively equal volumes of water to optimize the flow of water from the water inlet chamber 16 to the water outlet chamber 17 when the valve is "opened" to permit the flow of water therethrough.

The upper end of the valve housing 20 is counterbored to a plane immediately above the water outlets 22 to form a larger diametered portion 38. The inside of the larger diametered portion 38 is threaded at 39 to matingly couple the valve cartridge 11 to the improved dashpot mechanism 10 of the present invention as more fully described hereinafterwards.

It should be noted that while the present valve cartridge has been described and depicted herein as a particular kind of valve operable by axial-displacement of a valve control stem, that other kinds of axially-displaceable valves, such as a poppet valve, may be readily employed in conjunction with the present invention. And, by way of further and additional example, it may be clearly seen and understood with complete obviousness, that the present invention could readily employ a rotary valve actuatable by means of an axially-displaceable stem such as fully disclosed by R. G. Parkinson in U.S. Pat. No. 3,342,448.

Turning now with greater particularity to the present invention and with continued reference to the drawings, it may be said that, fundamentally speaking, the dashpot mechanism 10 comprises housing means 40, stem means 41, piston means 42, a pair of rolling diaphragms 43, fluid communication means 44, and check valve means 74.

The dashpot housing means 40 of this particular embodiment of the present invention comprises a tubular body 46 with an end member 47. The end member 47, in turn, comprises a generally tubular body 55 with a pair of internal portions 56,57 therein with unequal diameters; the larger diametered portion being identified at 56. Externally arranged about the larger diametered portion 56 is a threaded section 58. An annular groove 59 is cut about the rim of the larger diametered portion 56 the purpose of which will become apparent hereinafterwards. About the smaller diametered portion 57 is formed a flanged section 60, the outside diameter of which extends to the outer extremity of the tubular body 46. The tubular body has two open portions 48,49 therein of unequal inside diameters; the smaller diametered portion being identified at 48 and the larger diametered portion being identified at 49. The larger diametered portion 49 is internally threaded to form a threaded section 61 so that the corresponding threaded sections 58 of the end member 47 may be threadably mated to the tubular housing 46. The outside portion of the body 46 about the outside of the smaller diametered portion 48 is threaded at 50 to permit the body 46 to be threadably and removably mated to the threads at 39 about the inside of the larger diametered portion 49 to permit the valve cartridge 11 to be coupled to the improved dashpot mechanism 10 of the present invention.

Once coupled to the valve cartridge 11, the dashpot housing means 40 is slideably mated in contiguous relationship to the slightly larger in diameter upper portion 63 of the water supply pipe 12. An annular shoulder 64, preferably formed as an integral part of the dashpot housing means 40, is arranged thereabout, and, extends outwardly in a radial fashion therefrom. As the dashpot housing means 40 is urged into the water supply pipe 12, the shoulder 64 will contact a fluid-sealing gasket 65 which is disposed about the rim 66 of the water supply pipe 12.

In the preceding description, I have used the terms "upper" and "lower" to describe the relative location of the parts, when the valve mechanism is vertically disposed as shown in the drawings, but those skilled in the art will understand that the use of the invention does not require the valve mechanism to be vertically disposed. The same is true of the use such terms and also of such similar terms as "top" and "bottom" which are used hereinafterwards.

To retain the dashpot housing means 40 in fluid-sealing relationship with the gasket 65, a coupling member 13 is employed. The coupling member 13 comprises a tubular body 67 having an upper end 69 and a lower end 70 and having an inwardly directed, annular shoulder 68 intermediately disposed about the inside of the body 67, the diameter of which is slightly larger than the dashpot body 46 so as to fit thereinover. Below the shoulder 68 and disposed immediately about the inside of the coupling member 13 adjacent the lower end 70, is a threaded portion 71 adapted to be threadably engageable to the threaded section 14 of the water supply pipe 12. Following such threadable engagement with the water supply pipe 12, the coupling member 13 is rotated to urge the shoulder 68 into intimate engagement with the annular shoulder 64 of the tubular body 46, thereby forcing the annular shoulder 64 into fluid sealing engagement with the gasket 65.

Inside the tubular body 46 and located immediately beyond the smaller diametered portion 48, lies a series of progressively counterbored sections. The first counterbored section 51 lies immediately adjacent to the smaller diametered portion 48, the bottom of which lies a spot-faced section, forming a recessed land 52. The second counterbored section 53 extends throughout a substantial portion of the entire length of the balance of the tubular body 46, forming, as will be clearly shown as the discussion proceeds herein, the major portion of the dashpot chamber wherein the dashpot liquid is retained. The third counterbored section 54 is disposed between the internally threaded section 58 of the larger diametered portion 49 of the tubular body 46, and forms an annular shoulder 62 thereabout.

A dashpot stem means 41 is disposed within the tubular housing means 40 and the end member 47 and is reciprocally operable therein. The stem means 41 extends beyond the end member 47 and is conveniently formed as an integral extension of the valve stem 25. That portion of the dashpot stem means 41 is operably arranged in the smaller diametered portion 57 and the end member 47 and is disposed in slideable, contiguous relationship with the smaller diametered portion 57 for maintaining the dashpot stem means 41, and the various functional components fixedly secured thereto, in fixed, coaxial relationship relative to the valve housing, and acts as a vertical alignment guiding means for the dashpot stem means 41. Of course, since the dashpot stem means 41 and the valve stem 25 are formed as an integral unit, the combined coaxial alignment and vertical guiding effect is achieved for both the dashpot stem means 41 and the valve stem 25 by the combined efforts of the aperture 36 of the annular flange 31 and the smaller diametered portion 57 of the end member 47.

The dashpot piston means 42, depicted herein as an integral unit with the stem means 41 and is conveniently formed from a single piece of material, typically brass, is arranged intermediate the ends of the stem means 41 and operably located in the second counterbored section 53.

A small passageway is bored through the piston means 42 to form a liquid metering passageway 72, the purpose of which will be better understood as the description of the invention is more fully developed herein.

An annular groove 73 cut about the outer edge of the piston means 42 serves as a receptacle for the flexible flange which is disposed in conformal relationship to the inside wall of the second counterbored section 54 of the dashpot body 46; said flexible flange functioning as an annular check valve means 74. The check valve means 74, in its embodiment as a flexible flange as herein depicted and described, is typically fabricated from an elastomeric material, such as rubber, neoprene, plastic or the like. The annular flange forming the check valve means 74 has a generally V shaped cross-section. The inside leg 118 of the check valve means 74 is constructed for intimate contact with the bottom of the groove 73, and is formed so that the bottom of the leg 118 extends to the outer edge of the lower wall of the groove 73. By radially projecting the lower wall of the groove 73 and by positioning the notch of the V in the flange forming the check valve means 74 above the lower wall of the groove 73 and within the radius thereof, greater operational stability and control of this particular form of the check valve means 74 is achieved.

A pair of undercut portions in the stem means 41 located on either side of the piston means 42, form a pair of annular grooves 75,76 in the body of the stem means 41. Correspondingly, a pair of annular rolling diaphragms 77,78 are fixedly anchored in annular grooves 75,76 respectively in fluid sealing relationship with the stem means 41. Generally, this is accomplished by stretching the diaphragms 77,78 to temporarily increase the diameter of the apertures in the diaphragms 77,78 so that they are slightly larger than the diameter of the stem means 41, sliding the rims of the enlarged apertures over the stem means 41, aligning the rims of the enlarged apertures with the annular grooves 75,76 in the stem means 41 and, then, allowing the diaphragm apertures to return to their former, unstretched positions, the diameters of which are smaller than that of the stem means 41, thereby effecting a fluid sealing relationship therebetween.

The edge of the lower end of the dashpot tubular body 46 is undercut to form an annular grooved portion 79. As the dashpot body 46 is threadably mated with the valve housing 20, the outer rim of the lower rolling diaphragm 77 is captured between the grooved portion 79 of the tubular body 46 and the bottom of the larger diametered portion 38 of the valve housing 20, thereby effecting a fluid seal therebetween.

A washer-like element 80 having a major diameter slightly larger than the diameter of the second counterbored section 54 and smaller than the diameter of the third counterbored section 54, is placed at the bottom of the third counterbored section 54. The outer rim of the upper rolling diaphragm 78 is placed on the washer-like element 80. Thereafterwards, the end member 47 is threadably mated to the tubular body 46 and adjusted therewith to capture the outer rim of the upper rolling diaphragm 78 in fluid sealing relationship between the groove 59 of the end member 47 and the washer-like element 80.

Once the rolling diaphragms 77,78 are installed, a totally enclosed container or chamber for the dashpot liquid is formed. The dashpot chamber is functionally divided by the piston means 42 into chambers 81 and 82. Chamber 81 is the chamber lying between the piston means 42 and the lower rolling diaphragm 77 adjacent to the valve unit 11 and chamber 82 is the chamber lying between the piston means 42 and the upper rolling diaphragm 78. As shown in FIGS. 1 A and 2 A of the drawings, the stem-mounted piston means 42 is shown immediately following its actuation. Actuation is accomplished by manually depressing the pushbutton member 83. The pushbutton member 83 basically comprises a cup-shaped body 84 with a boss 85 depending from the crown of the body 84. The body of the boss 85 has two threaded receptacles 86 and 87 therein. The axis of one threaded receptacle 86 is disposed transversely to the axis of the boss 85; the other 87 is disposed in spaced-apart, parallel relationship to the axis of the boss 85. The boss 85 of the pushbutton member 83 is placed over the end of a collar 88 which is axially captured by a snap ring 89 on the stem means 41, but is free to rotate thereabout and the annular groove 90 about the collar 88 is aligned with the transversely-disposed receptacle 86. A set screw 91 is then passed through the aperture in the pushbutton member 83 and threadably engaged with the receptacle 86. The set screw 91 is subsequently adjusted so that the end thereof is disposed within the groove 90 to lock the pushbutton member 83 to the collar 88.

A set screw 92 is threadably mated with the receptacle 87. It may be adjusted so that the end 93 of the set screw 92 protrudes beyond the boss 85. The function and purpose of the second set screw 92 will become clearly apparent as the nature and function of the present invention continues to unfold in the discussion hereinafterwards.

With particular emphasis now on FIG. 2, there is depicted a mechanism similar to the embodiment of FIG. 1. The distinction therebetween is that a means for varying the flow of liquid through the liquid metering passageway, shown generally in FIG. 2 at 95. The adjustment means, generally shown at 96, fundamentally operates on the principle of adjusting the cross-sectional area to vary the rate of flow of liquid therethrough, and basically, comprises: stem means 41 with a longitudinally-disposed passageway 97 therein, a first fluid channel 98 linking the passageway 97 in fluid communications with the dashpot chamber 82, a second fluid channel 99 linking the passageway 97 in fluid communications with the dashpot chamber 81, a valve member 100, annular fluid sealing means 101 between the valve member 100 and the passageway 97, threaded retaining means 103 for retaining the annular fluid sealing means 101, and keyed receptacle means 102 for receiving a tool for effecting rotation, and, hence, adjustment of the valve member 100.

More particularly, the adjustment means 96 for varying the flow of liquid between chambers 81 and 82 of the dashpot liquid container comprises the stem means 41 further having a longitudinally-disposed passageway 97 therein, the passageway 97 exiting from the end of the stem means 41 to which the pushbutton member 83 is secured and extending beyond the piston means 42, and having at least two counterbored sections 104, 105. The smaller diametered counterbored section 104 extends to a point intermediate the piston means 42 and the larger diametered counterbored section 105 extends to a point intermediate the piston means 42 and the end of the stem means 41 to which the pushbutton member 83 is secured and has a threaded section thereabout throughout a substantial portion of its length. Linking the passageway 97 in fluid communication with chamber 82 is a first laterally-disposed fluid channel 98 drilled through the stem means 41 into the counterbored section 104. A second laterally-disposed fluid channel 99 is drilled through the stem means 41 and joins the non-counterbored section 108 of the passageway 97 in fluid communication with chamber 81. A needle valve member 109 which includes a shank portion 110 and a head portion 111 is operably disposed within passageway 97. The end of the shank possesses a tapered nose 112 and, as shown in the drawing, faces the juncture of the non-counterbored section 108 and the smaller diametered counterbored section 104 of the passageway 97. The headed portion 111 has a diameter greater than that of the shank portion 110 and has a threaded portion 113 thereabout which is threadably mateable with the threaded section 114 of the passageway 97. The head portion 111 further includes keyed receptacle means 102 for operably receiving a tool for rotating the head portion 111 and thereby effecting adjustment of the threaded engagement between the threaded portion 113 of the head portion 111 and the threaded section 114 of the passageway 97. An annular fluid sealing member 101, such as an O-ring elastomeric seal, is circumferentially-disposed about the shank portion 110 of the needle valve member 109 to prevent the liquid from flowing from the dashpot chambers 81 and 82, through the passageway 97 and thereafterwards beyond the head portion 111. In order to retain the fluid sealing member 101 in position, a threaded retaining means 117 is threadably mated to the threaded section 114 of the passageway 97 and so adjusted as to direct the fluid sealing member 101 against the innermost portion of the larger diametered counterbored section 105 thereby effectuating the retention thereof.

OPERATION OF THE INVENTION

Figures 2A, 2B:
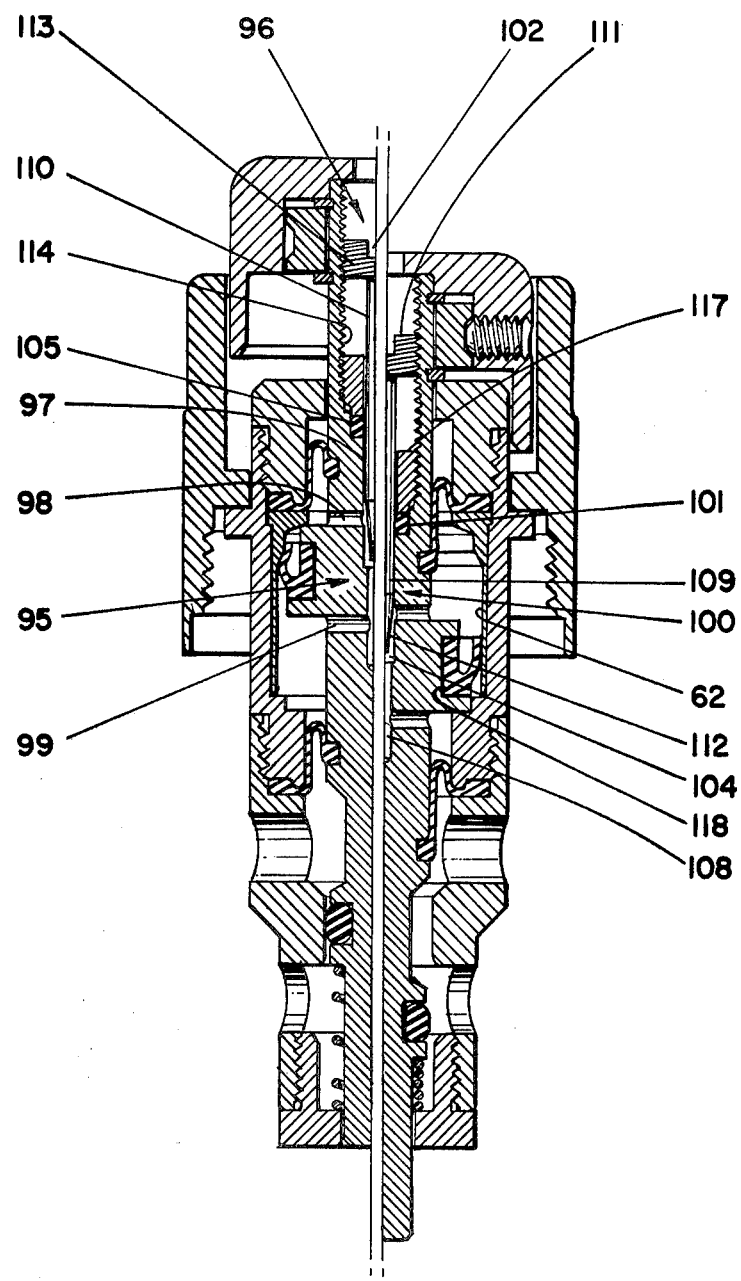
FIG. 2A if a cross-sectional view of another embodiment of a self-closing valve embodying the present invention wherein the component parts thereof are shown in an inoperative or "closed" position.
FIG. 2B is a cross-sectional view of the self-closing valve of FIG. 2A wherein the component parts thereof are shown in an operative or "open" position.

With continued reference to the drawings it may be seen that the operation of the present embodiment of the subject invention is effectuated by manually depressing the pushbutton member 83. As is clearly shown in FIGS. 1A and 2A, the present invention is depicted coupled to a plumbing valve 11, wherein the plumbing valve 11 is shown in its "closed" position, i.e. no liquid is flowing therethrough. On the other hand, FIGS. 1B and 2B illustrate the invention coupled to a plumbing valve 11 wherein the plumbing valve 11 is shown in its "open" position, i.e. liquid is flowing therethrough. The depression of the pushbutton member 83 produces a downward displacement of the dashpot stem means 41, and because the dash pot stem means 41 is formed as an integral part of the valve stem 25, such action produces a corresponding downward displacement of the valve stem 25, thereby unseating the valve head 23 from the valve seat 24.

When the valve head 23 is unseated, water flows from the water inlet chamber 16 into the water outlet chamber 17 via the unseated valve head 23 and the smooth bore section 32 of the valve seat 24. This unseated condition is illustrated, in vertical section, in FIGS. 1B and 2B.

As the valve head 23 is unseated, the silicon timing liquid in the dashpot chamber, defined as the second counterbored section 53 and described primarily as dash pot chambers 81 and 82, as a result of the piston movement of the dashpot piston means 42, the dashpot liquid forces the pheripheral lip 94 of the flexible flange forming the check valve means 74 towards the leg 118 thereby permitting the liquid to flow relatively unrestrictedly into the upper dashpot chamber 81. Additionally, an insignificant amount of the timing liquid enters the passageway 95 and also flows into chamber 81 from the lower dashpot chamber 82. Because the liquid is permitted to flow relatively unrestrictedly into the upper dashpot chamber 81 from the lower dashpot chamber 82, the manual force required to actuate the dashpot mechanism 10 and the plumbing valve unit 11 is relatively small, i.e. in the order of 4 to 6 pounds of actuating force, permitting actuation thereof by even kindergartenaged children as well as adults.

In the embodiment detailed in FIG. 2 of the present invention, the liquid would, of course, in flowing through the liquid metering passageway 95, first enter the lower fluid channel 99 in the dashpot stem means 41, then flow into passageway 97 and passed the needle valve member 109, into the upper fluid channel 98 and thereafterwards into the upper dashpot chamber 81.

With particular emphasis now again in FIG. 1, and assuming maximum displacement of the dashpot piston means 42, the lower face of the piston means 42 will bottom out against the bottom face of the first counterbored section 51. The depth of the first counterbored section 51 is generally made at least equal to the thickness of the lower wall of the piston means 42 above which lies the groove 73 about the edge of the piston means 42. Consequently, by so arranging the depth of the first counterbored section 51, maximum volumetric displacement of the dashpot chamber is insured along with maximum operational function thereof.

The pushbutton member 83 is released when bottoming out of the piston means 42 occurs as described above. However, the pushbutton member 83 may be released prior to the occurrence of such bottoming out. By adjusting the set screw 92 so that it protrudes beyond the boss 85, the effective stroke of the piston means 42 is reduced or limited to something less than the maximum stroke of the piston means hereinbefore described. At the time at the pushbutton member 83 is to be released, the spring 26 about the valve stem 35 is compressed as clearly illustrated in both FIGS. 1B and 2B. Accordingly, the compressed spring 26 exerts an upwardly directed bias on the valve stem 35 and, correspondingly so, on the dashpot stem means 41 which urges the dashpot piston means 42 upwardly towards the end member 47. As the dashpot piston means 42 beings to move in this aforementioned direction, the silicon dashpot liquid forces the lip 94 of the flexible flange outwardly and into fluid sealing, conformal engagement with the vertical wall of the second counterbored section 53 about the dashpot chamber. As a result, the dashpot liquid cannot flow from the upper dashpot chamber 81 into the lower dashpot chamber 82 via the check valve means 74. Consequently, the dashpot liquid is forced to flow solely from the upper chamber 81 into the lower chamber 82 via the liquid metering passageway 95.

The rate at which the dashpot piston means 42 travels towards the end member 47 is determined by the rate at which the dashpot liquid flows through the liquid metering passageway 95. The rate of liquid flow therethrough is determined by a number of factors, i.e. the magnitude of the spring biasing force exerted by the spring 62, the viscosity of the liquid, the volume of liquid being "displaced" and the cross-sectional area of the liquid metering passageway 95. However, in this particular case, the flow rate of the dashpot liquid through the passageway 95 is primarily determined by the cross-sectional area of the liquid metering passageway 95. In FIGS. 1A and 1B, the cross-sectional area of the liquid metering passageway 95 may be varied by varying the needle valve member 109. This is accomplished by engaging a tool, such as a small screwdriver or a hex wrench, with the keyed receptacle means 102 of the head portion 111 of the needle valve member 109. By rotating the head portion 111 with the engaged tool, the degree of threaded engagement between the threaded portion 113 of the head portion 111 and the threaded section 114 of the passageway 97 may be varied, thereby producing axial, longitudinal movement of the tapered nose 112 of the shank 110 of the needle valve member 109. By causing the tapered nose 112 to be moved into and out of the juncture of the non-counterbored section 108 and the smaller counterbored section 104 of the passageway 97 which forms a valve seat for the tapered nose 112 of the needle valve member 109, the effective cross-sectional area of the liquid metering passageway 95 may be varied.

Since the dashpot liquid is totally contained by the use of a pair of rolling diaphragms 77,78, no dashpot liquid is lost during each operation of the dashpot mechanism 10 as has been experienced in the prior art devices. Because the dashpot chamber so formed does not permit loss of the dashpot liquid, no contaminating particles or chemically active elements can be received therein to effectuate clogging of the liquid metering passageway 95 to thereby render the dashpot mechanism 10 inoperative as occurred with the prior art devices.

Silicon liquid having a viscosity index of about 200 to about 10,000 centistokes is preferred for use as the dashpot liquid not only because it is compatible with its operational environment by virtue of its non-toxic, potable, chemically-inert nature, but because it is also self-lubricating and has a stable and useful viscosity index over a relatively wide range of temperatures.

By virtue of its inherently self-lubricating properties and the dashpot mechanism's 10 design, a very low actuating force is achieved when using Dow Corning 200 Silicon fluid, for example, (200 centistokes) and the fluid passageway 95 having a diameter of at least 0.016 inches.

While I have shown and described a preferred embodiment in accordance with the present invention, it is understood that the same is not limited thereto but is susceptible of numerous changes and modifications within the spirit and scope thereof, and, I, therefore, do not wish to be limited to the details shown and described herein but intend to cover all such changes and modifications as are encompasssed by the scope of the appended claims.

For example, when the piston means 42 is returning to its pre-actuation position, it reaches a point very near its pre-actuation position when the bias force of the spring means 26 very nearly equals the counteracting force created by the combination of the piston means 42 and the dashpot liquid and the liquid metering passageway 95. In consequence thereof, the plumbing valve unit 11 remains "open" and water remainas flowing, albeit at an extremely low flow rate, for a relatively long period of time, i.e. approximately twenty-five percent of the total dashpot time delay period is determined by the last one-quarter inch or so of piston means 42 travel. This is not generally desirable. To eliminate this problem, an accelerating means 62 is employed so that when the piston means 42 comes very near its pre-actuation position, it is accelerated to cause it to achieve its pre-actuation position within a relatively short period of time, thereby positively "closing" the plumbing valve unit 11 and terminating the flow of water therethrough.

Such an accelerating means 62 is depicted in FIG. 2 of the drawings, comprising a tubular sleeve nested in contiguous relationship to the second counterbored portion 53 of the dashpot body 46 having opposite ends of unequal, internal diametered portions 119,120; portion 120 being the larger of the unequal diametered portions. The rim 121 of the portion 119 serves to replace the washer-like element 80 shown in FIG. 1 which retains the rolling diaphragm 43. The reduced diametered portion 119 acts to reduce the effective diameter of the piston means 42 by directing the lip 94 inwardly to reduce the flange diameter of the check valve means 74, thereby reducing the counteracting force created by the combination of the piston means 42 and the dashpot liquid and permitting the bias force created by the spring means 26 to readily drive the piston means 42 into its pre-actuation position and immediately closing the plumbing valve unit 11 without a significant time delay as heretofore described.

Figures 3A, 3B:
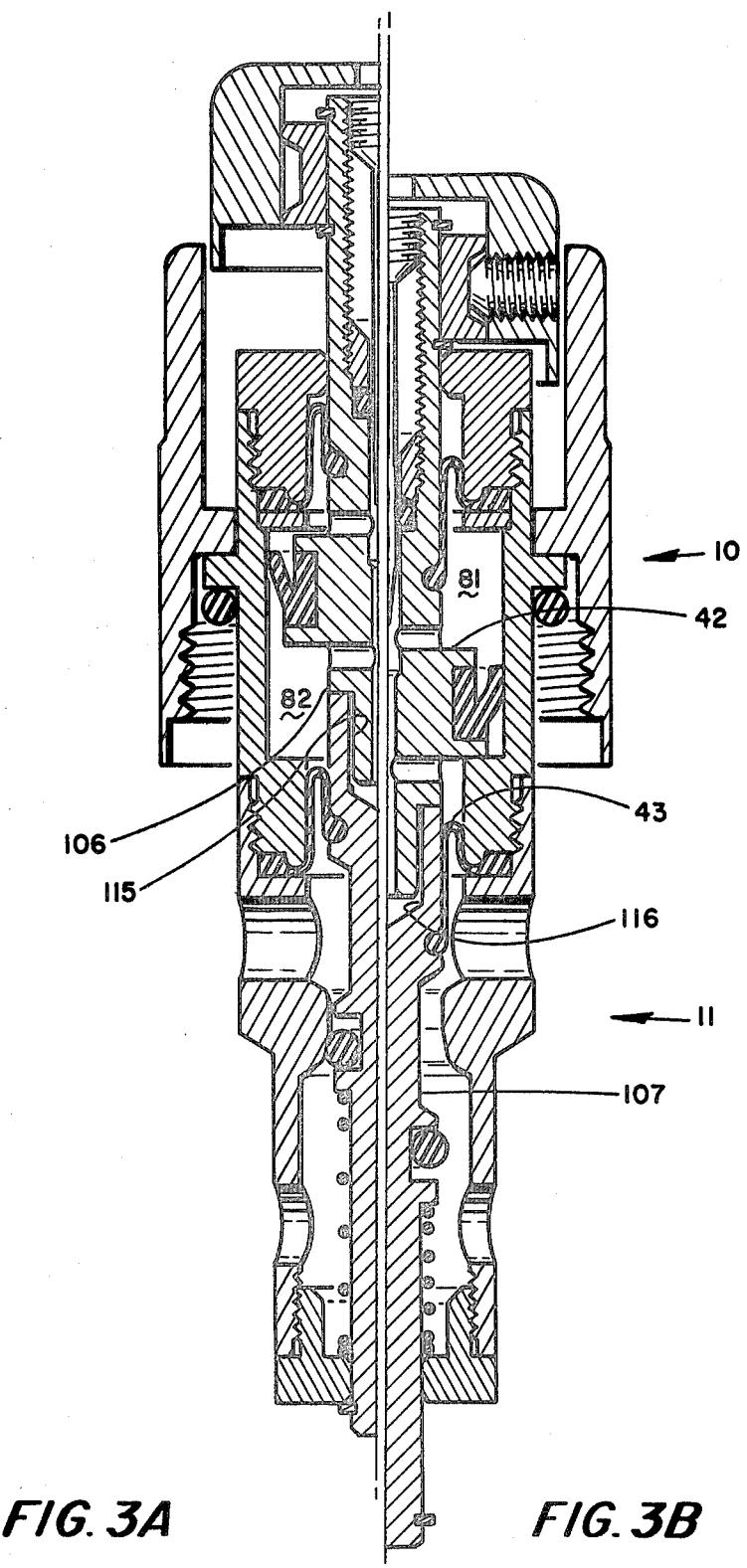
FIG. 3A is a cross-sectional view of another embodiment of a self-closing valve embodying the present invention wherein the component parts thereof are shown in an inoperative or "closed" postion.
FIG. 3B is a cross-sectional view of the self-closing valve of FIG. 3A wherein the component parts thereof are shown in an operative or "open" position.

By way of a still further example and with specific reference to FIGS. 3A and 3B, another embodiment of the present invention is illustrated. Shown therein is an embodiment having a pair of stems 106, 107; stem 106 being functionally associated with and disposed within the dashpot mechanism 10 and stem 107 being functionally associated with and primarily disposed within the plumbing valve unit 11. Stems 106, 107 are operably coupled together for axial displacement so that when stem 106 is directed towards stem 107, stem 107 is correspondingly axially displaced in the same direction and when stem 107 is urged towards the stem 106, stem 106 is correspondingly axially displaced in the same direction.

Coupling between the stems 106 and 107 is conveniently accomplished by undercutting the end of the stem 106 to form a reduced diametered portion 115, and by drilling out the end of the stem 107 facing the portion 115 of the stem 106 to form a cup-like portion 116 whose diameter is slightly larger than that of the portion 115, and then slideably mating portion 116 with portion 115.

By the use of a pair of stems 106, 107, the filling of the dashpot chambers 81, 82 with the time-delaying or dashpot liquid is greatly facilitated in the following fashion. Following the installation of the stem 107 and the rolling diaphragm 43 associated therewith, the dashpot liquid is caused to enter the dashpot chambers 81, 82. Thereafterwards, the reduced diametered portion 115 is slideably mated to the drilled out portion 116 of the stem 107. The upper rolling diaphragm 43 being associated with the stem 106 is then installed thereby also, by way of said installation, limiting the stroke of the stem 106 by way of capturing the piston means 42 which is fixedly secured to the stem 106.

What we claim is:

1. A fluid-filled dashpot mechanism comprising:
(a) housing means having a passageway therein;
(b) stem means reciprocally disposed in said passageway;
(c) pushbutton means secured to one end of said stem means for operably displacing said stem means;
(d) a pair of rolling diaphragms disposed in face-to-face relationship in said passageway and operably coupled in fluid sealing relationship to said housing means and said stem means so as to form an enclosed chamber within said housing means for containing said fluid therein;
(e) piston means dividing said chamber into two portions and reciprocally operable therein for displacement of said fluid in said chamber;
(f) means for operably associating said stem means with said piston means for reciprocation therewith;
(g) fluid communication means for providing continuous fluid communication between said chamber portions;
(h) check valve means operably associated with said stem means so that when said stem means is operably displaced in one direction said fluid flows from one chamber portion to the other through said check valve means and said fluid communication means, thereby allowing a reltively rapid displacement of said fluid between said chamber portions and effectuating relatively rapid displacement of said piston means and said stem means, and when said stem means is operably displaced in the opposite direction said fluid flows from said other portion to said one chamber portion through said fluid communication means thereby allowing a relatively slow displacement of said fluid between said chamber portions and effectuating relatively slow displacement of said piston means and said stem means; and
(i) stop means for limiting the stroke of said stem means, wherein said stop means for operably limiting the stroke of said stem means includes threaded rod means one end of which is threadably disposed in said pushbutton means and the other end extending beyond said pushbutton means towards said housing means, the distance between said other end of said rod and said housing means determining the stroke of said piston means by limiting the axial displacement of said stem means.

2. The mechanism of claim 1 further comprising:
(a) a valve having stem means operably associated therewith for the control thereof;
(b) means for operatively associating said stem means with said valve stem means,
(c) a housing for said valve;
(d) means for removably securing said dashpot housing means to said valve housing; and
(e) biasing means for urging said valve stem means towards said dashpot housing means.

3. The mechanism of claim 1 further comprising:
(a) a valve having stem means operably associated therewith for the control thereof; and
(b) means for operatively associating said stem means with said valve stem means, wherein said means for operatively associating said stem means with said valve stem means includes a single-piece elongated member one end of which functions as said stem means for said dashpot and the other end of which functions as said stem means.

* * * * *